US008315570B2

(12) United States Patent
Arbel

(10) Patent No.: US 8,315,570 B2
(45) Date of Patent: Nov. 20, 2012

(54) METHOD CIRCUIT AND SYSTEM FOR COMMUNICATION CHANNEL SCANNING AND SELECTION

(75) Inventor: Shlomo Arbel, Shoham (IL)

(73) Assignee: Amimon Ltd, Herzlia (IL)

( * ) Notice: Subject to any disclaimer, the term of this patent is extended or adjusted under 35 U.S.C. 154(b) by 136 days.

(21) Appl. No.: 12/735,394

(22) PCT Filed: Apr. 1, 2009

(86) PCT No.: PCT/IB2009/051374
§ 371 (c)(1),
(2), (4) Date: Jul. 13, 2010

(87) PCT Pub. No.: WO2009/122366
PCT Pub. Date: Oct. 8, 2009

(65) Prior Publication Data

US 2010/0311342 A1 Dec. 9, 2010

Related U.S. Application Data

(60) Provisional application No. 61/041,259, filed on Apr. 1, 2008.

(51) Int. Cl.
*H04B 15/00* (2006.01)

(52) U.S. Cl. .......................................... 455/62; 455/255

(58) Field of Classification Search .................... 455/62, 455/301, 188.2, 296, 147, 313, 45, 102, 255, 455/406, 63.1, 67.11, 86, 73, 437, 436, 426.2, 455/427, 429, 448, 323, 512, 422.1, 521, 455/209; 370/329, 337, 341, 208, 210, 315, 370/529, 347, 334, 335, 252, 332, 280, 521, 370/343, 480; 331/1 A, 16, 25, 22, 30; 361/816; 375/296, 260, 130, 141, 146; 725/73
See application file for complete search history.

(56) References Cited

U.S. PATENT DOCUMENTS 4,706,040 A * 11/1987 Mehrgardt .................... 331/1 A
5,475,876 A * 12/1995 Terada et al. ................ 455/301
2003/0035388 A1 * 2/2003 Schmidt ........................ 370/329

OTHER PUBLICATIONS

International Search Report for PCT/IB09/51374 dated Sep. 21, 2009.

* cited by examiner

*Primary Examiner* — Lana N Le
*Assistant Examiner* — Golam Sorowar
(74) *Attorney, Agent, or Firm* — Eitan Mehulal & Sadot

(57) ABSTRACT

Disclosed is a frequency scouting circuit with an adjustable frequency synthesizer. The scouting circuit may be collocated with other radio frequency integrated circuits on the same die. The synthesizer may include a dedicated oscillator, and the synthesizer may be adapted to generate a mixing signal at a given frequency. A channel monitoring circuit block may be adapted to determine availability of a carrier frequency corresponding to the mixing signal frequency, and control logic may be adapted to select the given frequency from a set of possible transmission carrier frequencies for a functionally associated transmitter.

24 Claims, 9 Drawing Sheets

CHANNEL TABLE

| NUMBER | FREQUENCY | AVAILABLE | QUALITY | TIMESTAMP |
|---|---|---|---|---|
| 1 | 5250 MHz | Y | 75% | 12.03.2009.14.22.34 |
| 2 | 5260 MHz | Y | 80% | 12.03.2009.14.23.35 |
| 3 | 5270 MHz | N | 85% | 12.03.2009.14.24.36 |
| 4 | 5280 MHz | N | 80% | 12.03.2009.14.25.37 |
| 5 | 5290 MHz | Y | 75% | 12.03.2009.14.26.38 |
| ... | ... | ... | ... | ... |

FIG. 4

METHOD CIRCUIT AND SYSTEM FOR COMMUNICATION CHANNEL SCANNING AND SELECTION

CROSS-REFERENCE TO RELATED APPLICATIONS

The present application is a US National Phase of PCT Application No. PCT/IB2009/051374, filed on Apr. 1, 2009, which claims the benefit under 35 U.S.C. 119(e) of US Provisional Application 61/041,259 filed Apr. 1, 2008, the disclosure of which is incorporated herein by reference.

FIELD OF THE INVENTION

The present invention relates generally to the field of communication. More specifically, the present invention relates to a method, circuit and system for communication channel scanning and selection.

BACKGROUND

Wireless communication has rapidly evolved over the past decades. Even today, when high performance and high bandwidth wireless communication equipment is made available there is demand for even higher performance at a higher data rates, which may be required by more demanding applications.

Video bearing signals may be generated by various video sources, for example, a computer, a game console, a Video Cassette Recorder (VCR), a Digital-Versatile-Disc (DVD), or any other suitable video source. In many houses, for example, video content is received through cable or satellite links at a Set-Top Box (STB) located at a fixed point.

In many cases, it may be desired to place a display, screen or projector at a location at a distance of at least a few meters from the video source. This trend is becoming more common as flat-screen displays, e.g., plasma or Liquid Crystal Display (LCD) televisions are hung on walls. Connection of such a display or projector to the video source through cables is generally undesired for aesthetic reasons and/or installation convenience. Thus, wireless transmission of the video signals from the video source to the screen may be preferable.

Dynamic Frequency Selection (DFS) mechanisms may be required, for example, by communication committees' standards and/or regulations, e.g., to enforce usage priorities of a Radio-Frequency (RF) spectrum and/or coexistence of different users. In one example, according to the IEEE 802.11h standard, a wireless communication device may be required to scan for a radar transmission, and to avoid and/or discontinue performing a wireless transmission over the communication channel if a radar transmission is detected.

A RF spectrum, e.g., The 5 Giga Hertz (GHz) spectrum, may be designated for Radio Local Area Network (RLAN) operation, providing that certain regulations are adhered to. The European Radio-communications Committee (ERC) published its decision on the harmonized frequency bands to be designated for the introduction of High Performance Radio Local Area Networks (HIPERLANS), in 1996, allocating the bands 5150-5250 MHz for RLANs. In 1999 it published an amendment that recognized the need for more bandwidth for RLAN applications, and decided to designate the bands 5250-5350 and 5470-5725 MHz, stipulating specific conditions to be applied to RLANs operating in this range. Among these new regulations are included restrictions on transmit power, avoiding occupied channels and ensuring a uniform spreading of signals over all the available channels, by employing a DFS mechanism, and employing a Transmit Power Control (TPC) mechanism. These constraints do not apply to the already allocated bands 5150-5250 MHz. Following the World Radio Conference on 2003, where those bands were harmonized world-wide, the Electronic Communication Committee (ECC) has published a new amendment, generalizing the decisions made regarding any RLAN or WAS (Wireless Access Systems), and stating that compliance with the standard may be demonstrated by compliance with standard EN 301 893, published by ETSI. The IEEE has adopted those requirements and published the IEEE 802.11h standard for 802.11 WLAN devices. In the US, the Federal Communication Commission (FCC) has adopted similar restrictions and has published them in 47 CFR §15.407.

There is thus a need in the field of wireless communication for improved methods, circuits, devices and systems for transmission.

SUMMARY OF THE INVENTION

The present invention is a method, circuit and system for communication channel scanning and selection. According to some embodiments of the present invention, there is provided a circuit and system for communicating data between a transmitter and a receiver over one or more carrier frequencies selected from a set of possible carrier frequencies. The transmitter may be adapted to transmit one or a set of logical data channels over a given carrier frequency. According to some embodiments of the present invention, such as those employing quadrature amplitude modulation ("QAM"), the transmitter may transmit two carrier signals at a given frequency, and a logical channel may be transmitted using both carriers. Prior to the transmitter transmitting at a given carrier frequency, the frequency may be checked by a carrier frequency scouting circuit. The frequency scouting circuit may be collocated on the same die as other radio frequency integrated circuits (e.g. transmitter circuit or receiver circuit) and adapted to check for the presence of signals or noise (e.g. from other transmitters, radars or any other source of radiation) on some or all of the carrier frequencies from the set of carrier frequencies usable by the transmitter. The scouting circuit may be adapted to scan/scout/check carrier frequencies in spectral proximity (e.g. adjacent to) to frequencies currently being used by the transmitter while the transmitter is transmitting.

The carrier frequency scouting circuit may include an amplifier and a down converter (e.g. mixer) functionally associated with an adjustable oscillator, for example a voltage controlled oscillator ("VCO"). The frequency scouting circuit may also include a signal detection circuit block adapted to detect and measure signal strength and/or average power of one or more signals/noise which may be present at a carrier frequency being checked/scouted by the scouting circuit. According to further embodiments of the present invention, the signal detection circuit block may be adapted to detect short signal bursts or pings (e.g. 20 to 500 nanoseconds) such as those generated by a radar system.

According to some embodiments of the present invention, the oscillator functionally associated with the frequency scouting circuit may be integral with the scouting circuit. The oscillator may be a dedicated oscillator, only supporting the functionality of the scouting circuit. According to further embodiments of the present invention, the oscillator may be designed so as to mitigate electromagnetic coupling between the oscillator and other circuit blocks in proximity, for example other oscillators on the same or nearby die or integrated circuit. The oscillator may be a ring oscillator or any other oscillator architecture, known today or to be devised in the future, avoiding circuit components having relatively high inductive characteristics (e.g. a solenoid, an inductor, etc.).

According to some embodiments of the present invention, the frequency scouting circuit may be used in a spread spectrum and/or channel allocation scheme (e.g. Dynamic Channel Allocation, Dynamic Channel Assignment or Dynamic Frequency Selection) designed to test carrier frequencies from the set of carrier frequencies usable by the transmitter. The frequency scouting circuit may test each carrier frequency in the set of carrier frequencies in a predetermined hopping pattern or some practical order (e.g. from lowest frequency to highest frequency). In some demonstrative embodiments, the frequency scouting circuit may scan a specific frequency for a period of time, for example, but not limited to, 60 seconds for Dynamic Frequency Selection ("DFS") protocol. During this period of time, the frequency scouting circuit may sense energy transmitted at the specific frequency and may update a table of relevant data values in reference to the specific frequency. After updating the table, the frequency scouting circuit may begin scanning the next carrier frequency in the set of usable carrier frequencies by the transmitter.

According to some embodiments of the present invention, the frequency scouting circuit may be designed as a sub-circuit of a larger circuit containing other sub-circuits (e.g. a data transmitter sub-circuit and/or a data receiver sub-circuit). The larger circuit may be a module designed for wireless communication, for example, a radio frequency integrated circuit ("RFIC") which may be a data transmitter or a data receiver.

According to some embodiments of the present invention, the frequency scouting circuit may interact with an RFIC that may be concurrently, or otherwise, transmitting and/or receiving wireless data at available carrier frequencies. The RFIC may be using a frequency/channel lookup table that lists carrier frequencies along with relevant data associated with each carrier frequency. In some embodiments, the frequency scouting circuit may update the frequency lookup table independently, while in other embodiments, the frequency scouting circuit may be dependent on the status of other associated sub-circuits.

According to some embodiments of the present invention, the channel lookup table may contain one or more data values associated with each particular channel. In some embodiments, the table may contain a Boolean value indicating that a particular channel is available to be used for wireless communication or that it is currently occupied. Other embodiments may include a value indicating the channel quality. Further embodiments may include a timestamp associated with each entry into the table.

Some demonstrative embodiments of the present invention include communication transmitters and/or receivers which may operate in a set frequency range and/or available channels. While communicating, it may be necessary for the communication modules to have an updated list of other available channels. In some demonstrative embodiments, a frequency scouting circuit may concurrently scan the usable channels and update a table of channel quality that may serve as a list of available channels to the communication module.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is an exemplary channel lookup table according to some embodiments of the present invention.

Figure 1A:
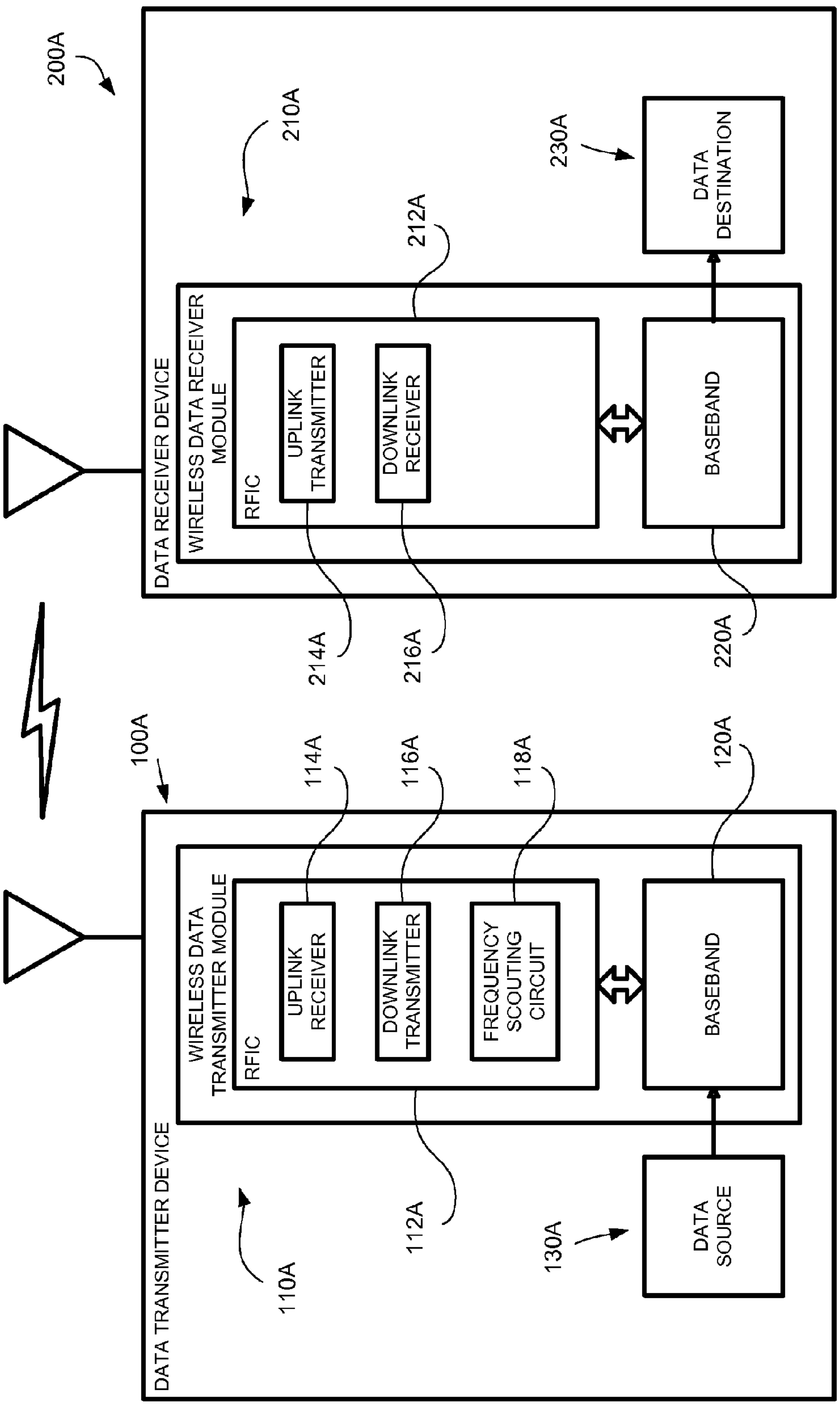
FIG. 1A is a functional block diagram of an exemplary data transmitter/receiver pair according to some embodiments of the present invention where the transmitter includes a frequency scouting circuit block.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, DVDs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be understood that some embodiments of the present invention may be used in a variety of applications. Although embodiments of the invention are not limited in this respect, one or more of the methods, devices and/or systems disclosed herein may be used in many applications, e.g., civil applications, military applications or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, embodiments of the invention are not limited in this respect and some embodiments may be implemented to perform wireless communication of any other suitable information, for example, multimedia information, e.g., audio information, in addition to or instead of the video information. Some embodiments may include, for example, a method, device and/or system of performing wireless communication of A/V information, e.g., including audio and/or video information. Accordingly, one or more of the devices, systems and/or methods described herein with relation to video information may be adapted to perform wireless communication of A/V information.

According to some embodiments of the present invention there is provided a frequency scouting circuit collocated on the same integrated circuit or die as other radio frequency integrate circuits such as a radio transmitter, radio receiver and/or a radio transceiver. The frequency scouting circuit may be adapted to scan/scout carrier frequencies substantially simultaneously with the operation (e.g. transmission or reception) of other radio circuit frequency circuits on the same die—that is, to scan a carrier frequency while a transmitter or receiver on the same die is either transmitting or receiving a signal on an adjacent or spectrally close carrier frequency.

According to some embodiments of the present invention, the scouting circuit may include an adjustable frequency synthesizer with a dedicated oscillator, and the synthesizer may be adapted to generate a mixing signal at a given frequency selected by control logic adapted to select the given frequency from a set of possible transmission carrier frequencies for a functionally associated transmitter circuit. A down converter functionally associated with said synthesizer and adapted to down convert signals at substantially the mixing signal frequency may be functionally associated with a channel monitoring circuit block adapted to determine availability of a carrier frequency corresponding to the selected mixing signal frequency. The channel monitoring circuit block may be further adapted to indicate carrier frequency availability and/or and carrier frequency quality.

According to some embodiments of the present invention the control logic may be adapted to indicate carrier frequency availability to the functionally associated transmitter circuit over signaling lines (when the scouting circuit is on the same IC as the transmitter) or over an uplink (when the scouting circuit is on a different IC as the transmitter). According to other embodiments, the control logic may be further adapted to update a record in a data table regarding carrier frequency availability that may be sent to the functionally associated transmitter circuit over signaling lines (when the scouting circuit is on the same IC as the transmitter) or over an uplink (when the scouting circuit is on a different IC as the transmitter).

According to embodiments of the present invention where the scouting circuit is collocated on the same die as a transmitter, the scouting circuit may include adaptive filters to filter out frequencies being transmitted by the transmitter at the same time the scouting circuit is scanning/scouting adjacent or spectrally close carrier frequencies. According to further embodiments of the present invention, the operating of the scouting circuit may be interleaved with the operation of the transmitter—for example when the transmitter is associated with video frame transmission, the scouting circuit may operate during the Vertical Blink Interval ("VBI") in between frame transmission periods.

According to some embodiments of the present invention, the control logic may be adapted to select the given frequency to be scanned/scouted in response to signaling from the functionally associated transmitter circuit. According other embodiments, the control logic may be adapted to select the given frequency based on a frequency scanning pattern or algorithm.

According to some embodiments of the present invention the oscillator of the scouting circuit may be a dedicated oscillator which may be electromagnetically uncoupled from other oscillators on the same die or otherwise in proximity. According to further embodiments of the present invention the scouting circuit oscillator may be a ring oscillator.

According to some embodiments of the present invention, there is provided a communication device including a transmitter, a receiver and/or a transceiver adapted to transmit/receive data over one or more carrier frequencies from a set of possible carrier frequencies. The communication device may include a frequency scouting circuit including an adjustable frequency synthesizer with a dedicated oscillator, and the synthesizer may be adapted to generate a mixing signal at a given frequency selected by control logic adapted to select the given frequency from a set of possible transmission carrier frequencies for a functionally associated transmitter circuit. A down converter functionally associated with said synthesizer and adapted to down convert signals at substantially the mixing signal frequency may be functionally associated with a channel monitoring circuit block adapted to determine availability of a carrier frequency corresponding to the selected mixing signal frequency. The scouting circuit may be adapted to scan/scout spectrally close frequencies (e.g. adjacent) to those being used by the transmitter/receiver substantially concurrently with the operation of the transmitter/receiver—at or about the same time the receiver is receiving and/or the transmitter is transmitting.

The channel monitoring circuit block may be further adapted to indicate carrier frequency availability and/or and carrier frequency quality. According to some embodiments of the present invention the control logic may be adapted to indicate carrier frequency availability to the functionally associated transmitter circuit over signaling lines (when the scouting circuit is on the same IC as the transmitter) or over an uplink (when the scouting circuit is on the same IC as the receiver). According to other embodiments, the control logic may be further adapted to update a record in a data table regarding carrier frequency availability that may be sent to the functionally associated transmitter circuit over signaling lines (when the scouting circuit is on the same IC as the transmitter) or over an uplink (when the scouting circuit is on a different IC as the transmitter).

According to some embodiments of the present invention the control logic may be adapted to select the given frequency in response to signaling from the functionally associated transmitter circuit. According other embodiments the control logic may be adapted to select the given frequency based on a frequency scanning pattern or algorithm.

According to some embodiments of the present invention the oscillator may be a dedicated oscillator which may be electromagnetically uncoupled from other oscillators in proximity. According to further embodiments of the present invention the oscillator may be a ring oscillator.

Figure 1B:
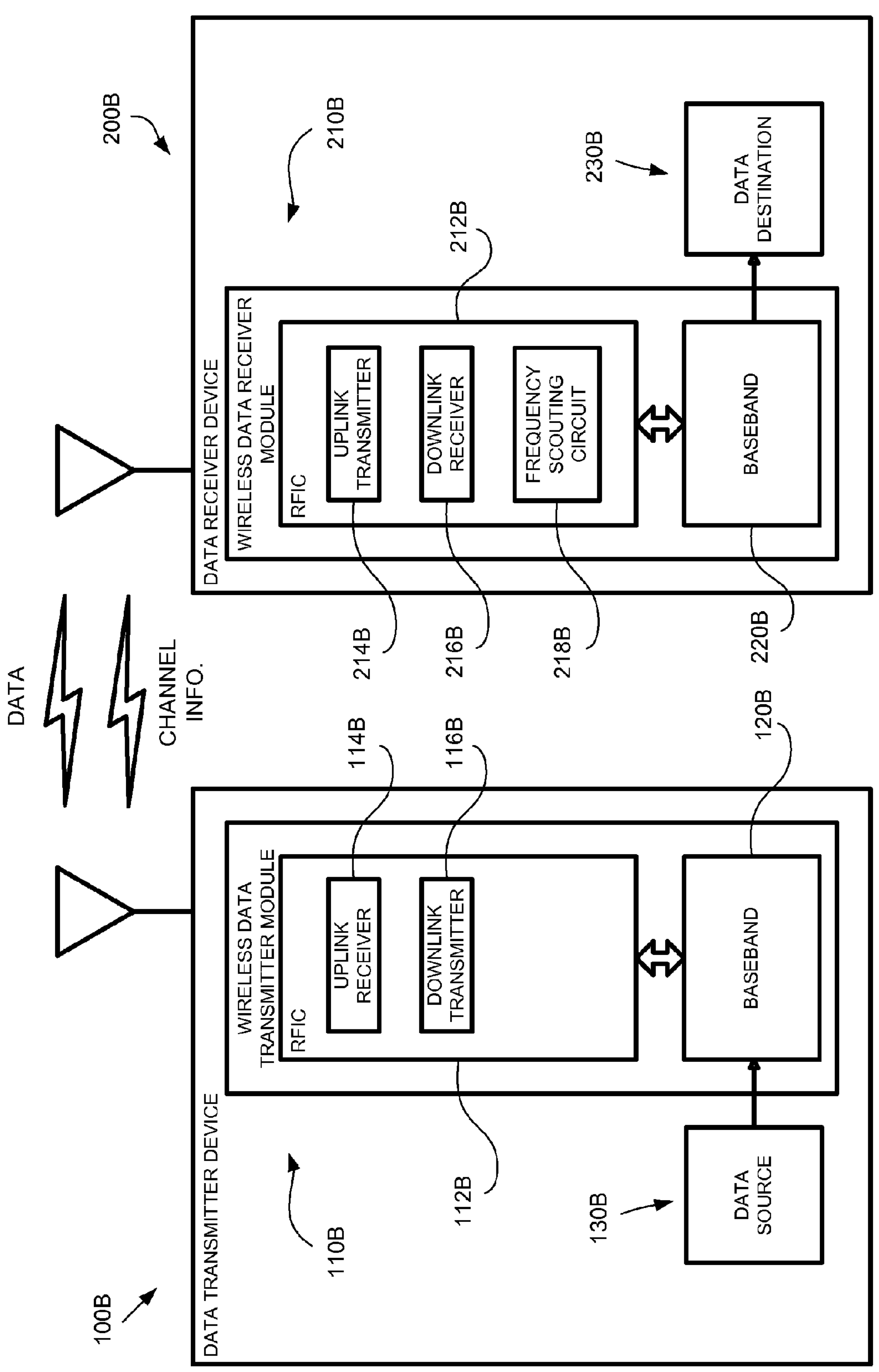
FIG. 1B is a functional block diagram of an exemplary data transmitter/receiver pair according to some embodiments of the present invention where the receiver includes a frequency scouting circuit block and transmits channel availability information to the transmitter.
Figure 2A:
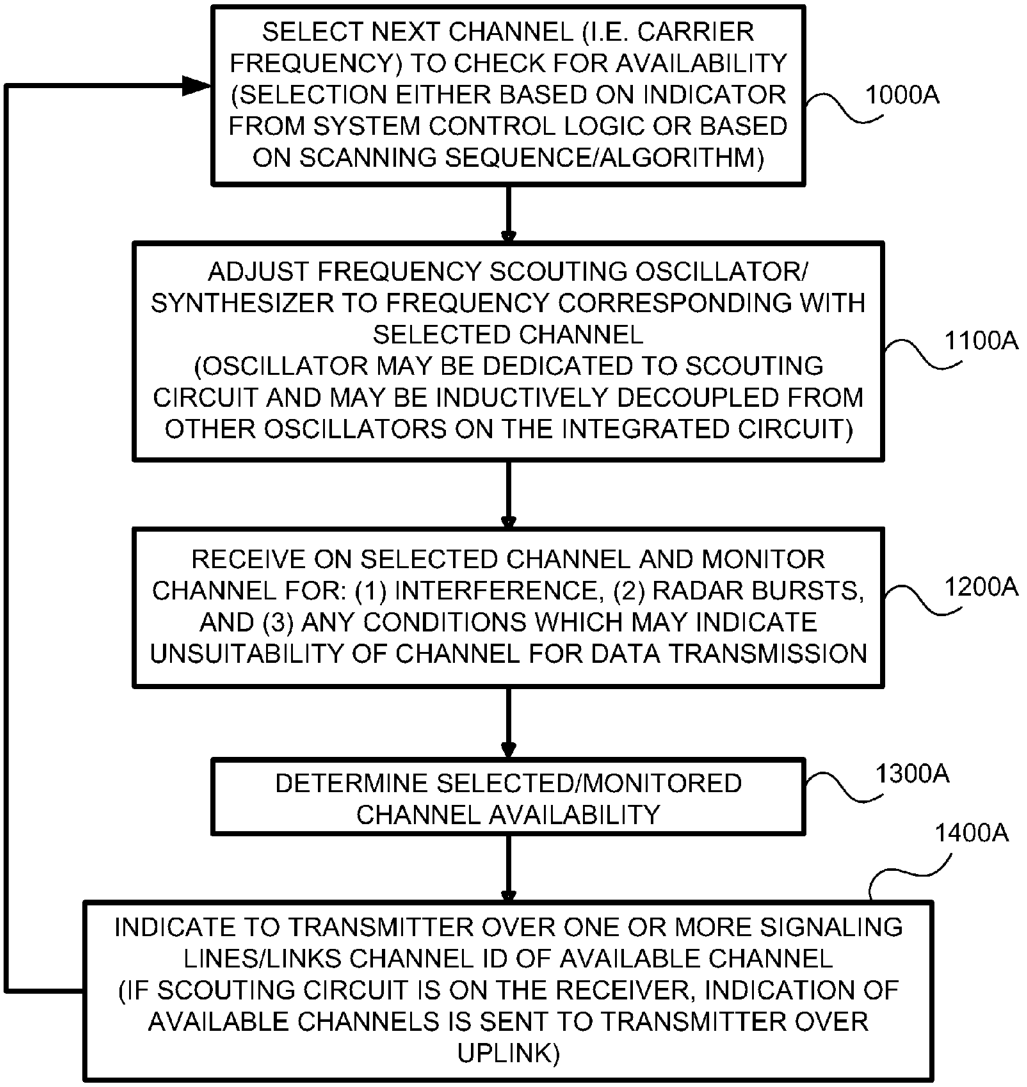
FIG. 2A is a flow chart including the steps of an exemplary method by which a scouting circuit according to some embodiments of the present invention may check availability of a given carrier frequency for transmission of data.
Figure 2B:
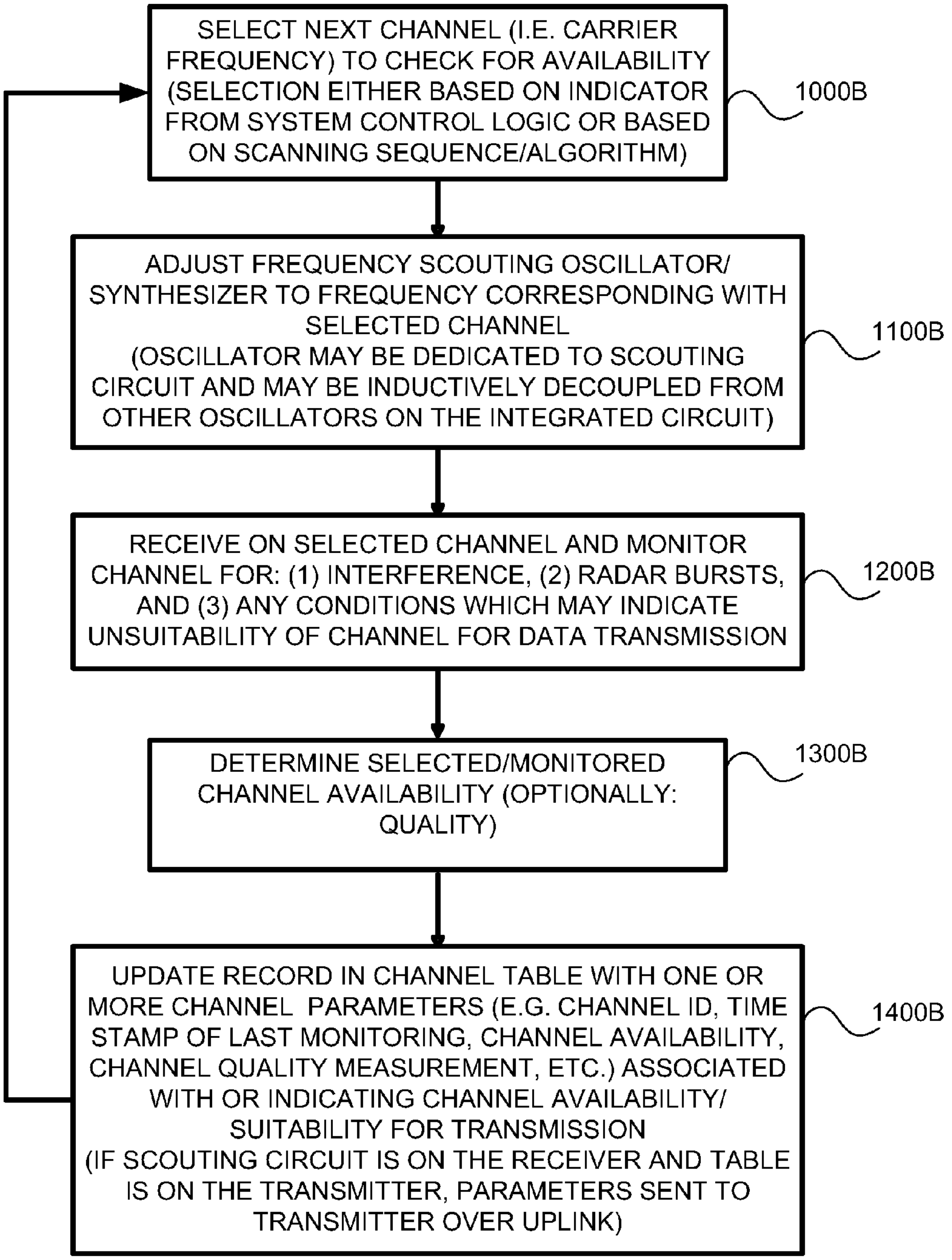
FIG. 2B is a flow chart including the steps of a further exemplary method by which a scouting circuit according to some embodiments of the present invention may sequentially check availability and/or quality of multiple carrier frequencies and may update a lookup table of available channels accordingly.

Turning now to FIGS. 1A & 1B, there are shown functional block diagrams of exemplary data transmitter/receiver pairs including a channel scouting circuit block according to some embodiments of the present invention. The operation of the scouting circuit may be described in view of FIGS. 2A & 2B, showing: FIG. 2A—a flow chart including the steps of an exemplary method by which a scouting circuit according to some embodiments of the present invention may check availability of a given carrier frequency for transmission of data; and FIG. 2B—a flow chart including the steps of a further exemplary method by which a scouting circuit according to some embodiments of the present invention may sequentially check availability and/or quality of multiple carrier frequencies and may update a lookup table of available channels accordingly.

According to some embodiments of the present invention, prior to a transmitter (100A & 100B) transmitting data over a given carrier frequency, a functionally associated scouting circuit (118A & 218B) may check the given carrier frequency for availability and/or quality. The scouting circuit may select (1000A & 1000B) which carrier frequency to scan/check based on either signaling from control logic associated with the transmitter or based on internal control logic which adapted to implement a scanning sequence or algorithm. The scouting circuit may proceed to adjust its oscillator/synthesizer (1100A & 1100B) to the selected channel and may receive signals and/or noise on the channel while monitoring (1200A & 1200B) for interference, radar bursts and any conditions which may indicate unsuitability of channel for data transmission. The oscillator may be dedicated to the scouting circuit and may be inductively decoupled from other oscillators on the integrated circuit. The scouting circuit may determine selected/monitored channel availability (1300A & 1300B) and or quality (1300B).

According to some embodiments of the present invention, the scouting circuit may indicate (1400A) the ID of the available channel to the transmitter (116A) over one or more signaling lines or links. If the scouting circuit is on the receiver, indication of available channels may be sent to the transmitter (114B) over an uplink. According to other embodiments of the present invention, the scouting circuit may update (1400B) a record in channel table (FIG. 4) with one or more channel parameters (e.g. channel ID, timestamp of last monitoring, channel availability, channel quality measurement, etc.) associated with or indicating channel availability and/or suitability for transmission. If the scouting circuit is on the receiver and table is stored on the transmitter, the parameters may be sent to the transmitter over an uplink.

Turning now to FIG. 2A, there is shown a flow chart including the steps of an exemplary method by which a scouting circuit according to some embodiments of the present invention may check availability of a given carrier frequency for transmission of data. FIG. 2B is a flow chart including the steps of a further exemplary method by which a scouting circuit according to some embodiments of the present invention may sequentially check availability and/or quality of multiple carrier frequencies and may update a lookup table of available channels accordingly.

Figure 3A:
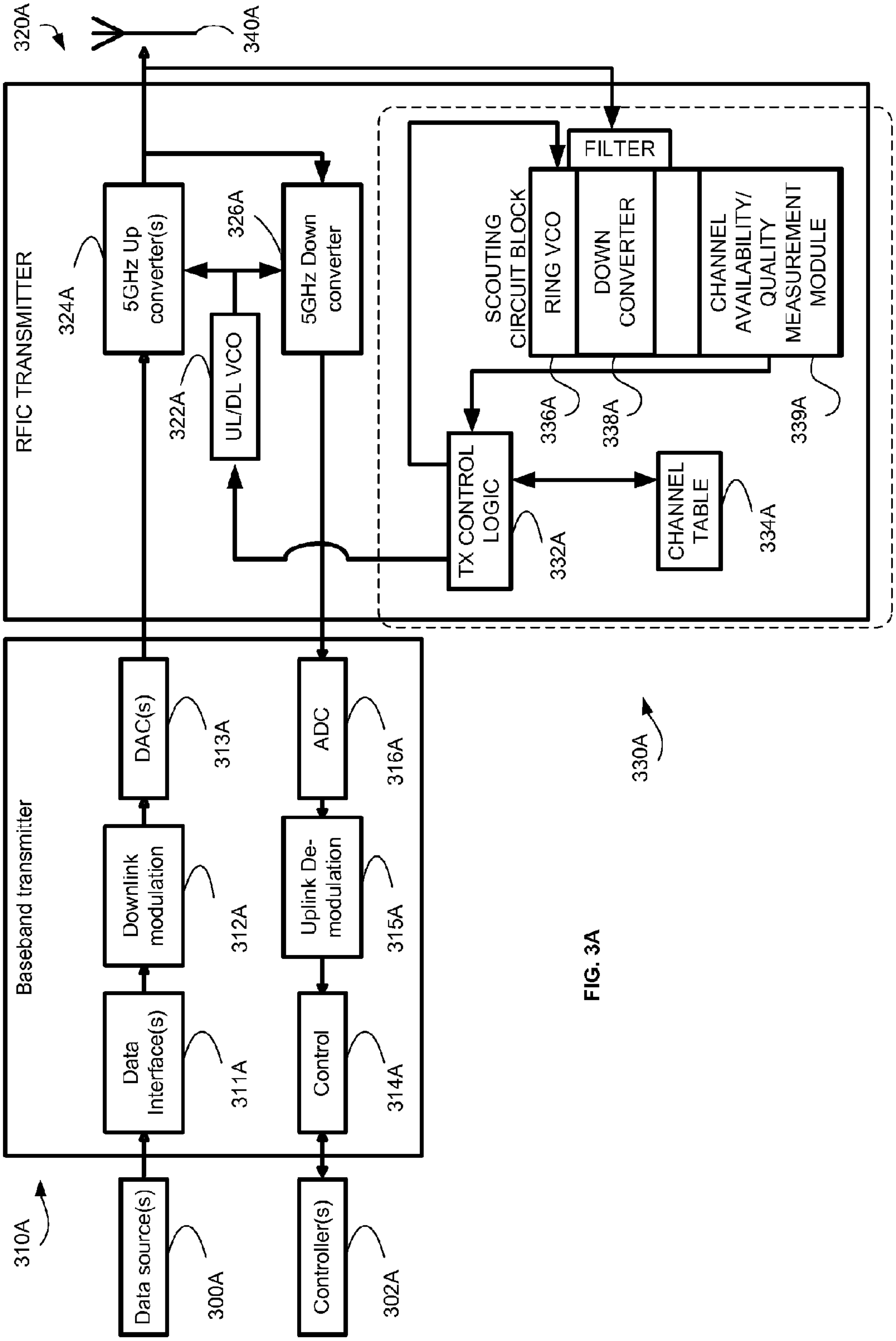
FIG. 3A is a functional block diagram of a transmitter IC including a channel scouting circuit according to some embodiments of the present invention.

Turning now to FIG. 3A, there is shown a functional block diagram of a transmitter IC including a channel scouting circuit (330A) according to some embodiments of the present invention. The transmitter IC may be functionally associated with one or more controllers (302A) and/or sources of data (300A) which may control the flow of data input to the transmitter. According to some embodiments of the present invention, the transmitter may contain or may be functionally associated with a baseband transmitter module or circuit block (310A) which may be dedicated to signal processing and/or signal control.

According to some embodiments of the present invention, a RFIC transmitter (320A) may up convert (324A) downlink signals to be transmitted via an antenna (340A) or some equivalent signal broadcasting device. The transmitter may down convert (326A) uplink signals received on an antenna or some equivalent signal receiving device. A functionally associated uplink/downlink VCO (322A) may be controlled by TX control logic (332A) and may provide signals for the up converter and/or down converter.

According to some embodiments of the present invention, a RFIC transmitter (320A) may be functionally associated with a scouting circuit block (330A) that may be controlled by TX control logic (332A). The scouting circuit block may have a ring VCO (336A), decoupled from other VCOs, enabling a down converter (338A) to receive signals and/or noise through an antenna (340A) or some equivalent signal receiving device. Received signals may be evaluated by a channel availability/quality measurement module (339A) which may send channel information to TX control logic. According to some embodiments, TX control logic may work in concert with a channel table (334A), further described in FIG. 4, to update and access relevant channel information.

Figure 3B:
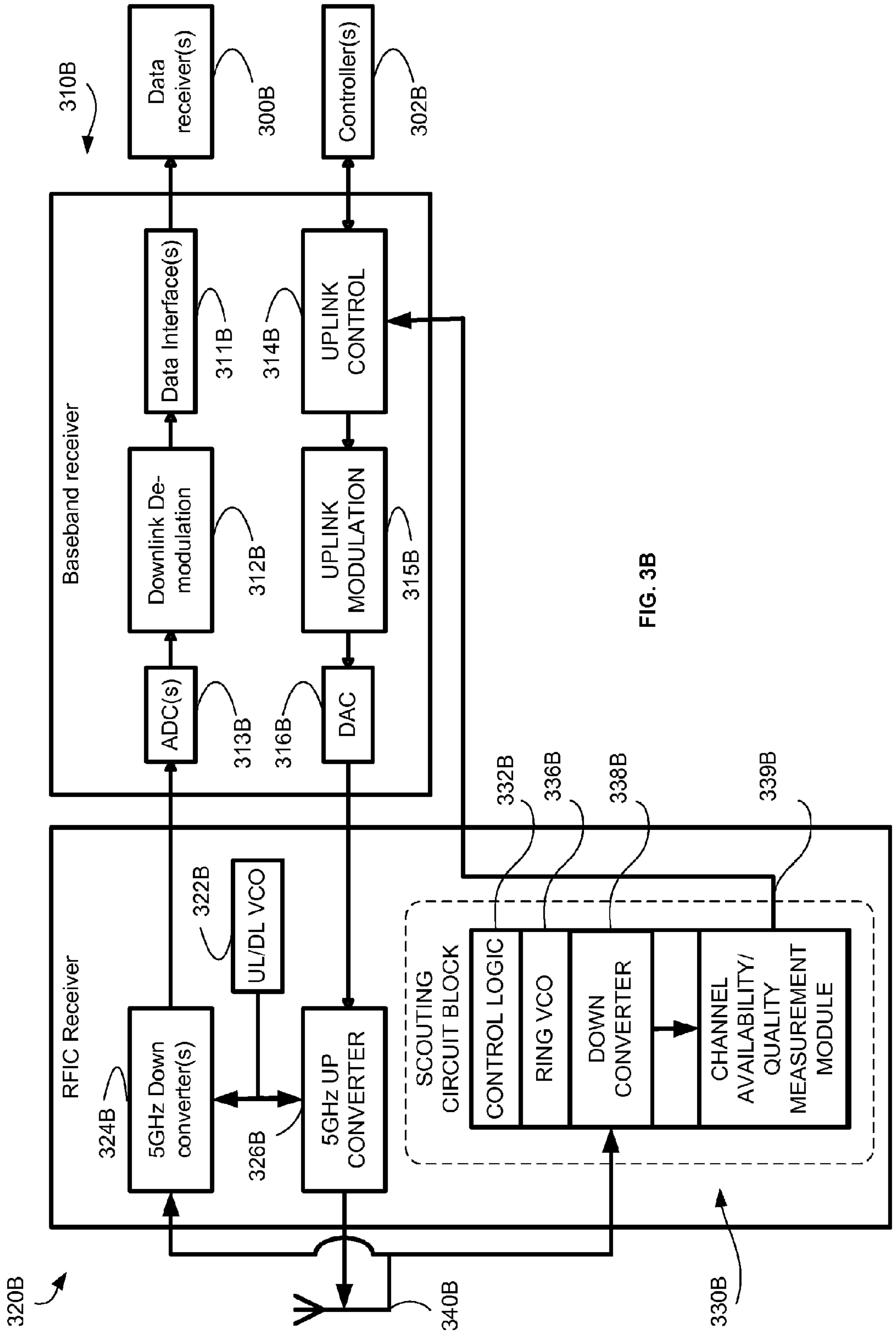
FIG. 3B is a functional block diagram of a receiver IC including a channel scouting circuit according to some embodiments of the present invention.

Turning now to FIG. 3B, there is shown a functional block diagram of a receiver IC including a channel scouting circuit (330B) according to some embodiments of the present invention. The receiver IC may be functionally associated with one or more controllers (302B) and/or receivers of data (300B) which may control the flow of data received. According to some embodiments of the present invention, the receiver may contain or may be functionally associated with a baseband receiver module or circuit block (310B) which may be dedicated to signal processing and/or signal control.

According to some embodiments of the present invention, a RFIC receiver (320B) may down convert (324B) downlink signals received on an antenna (340B) or some equivalent signal receiving device. The receiver may up convert (326B) uplink signals to be transmitted via an antenna or some equivalent signal broadcasting device. A functionally associated uplink/downlink VCO (322B) may provide signals for the up converter and/or down converter.

According to some embodiments of the present invention, a RFIC receiver (320B) may be functionally associated with a scouting circuit block (330B) that may be controlled by internal control logic (332B). The scouting circuit block may have a ring VCO (336A), decoupled from other VCOs, enabling a down converter (338B) to receive signals and/or noise through an antenna (340B) or some equivalent signal receiving device. Received signals may be evaluated by a channel availability/quality measurement module (339B) which may send channel information to uplink control logic (314B). Relevant channel information may be sent through the uplink to a functionally associated transmitter for quality data flow through suitable channels.

Turning now to FIG. 4, there is shown an exemplary channel lookup table according to some embodiments of the present invention. The table may include one or more channel parameters (e.g. channel ID, timestamp of last monitoring, channel availability, channel quality measurement, etc.) associated with or indicating channel availability and/or suitability for transmission.

Figure 5:
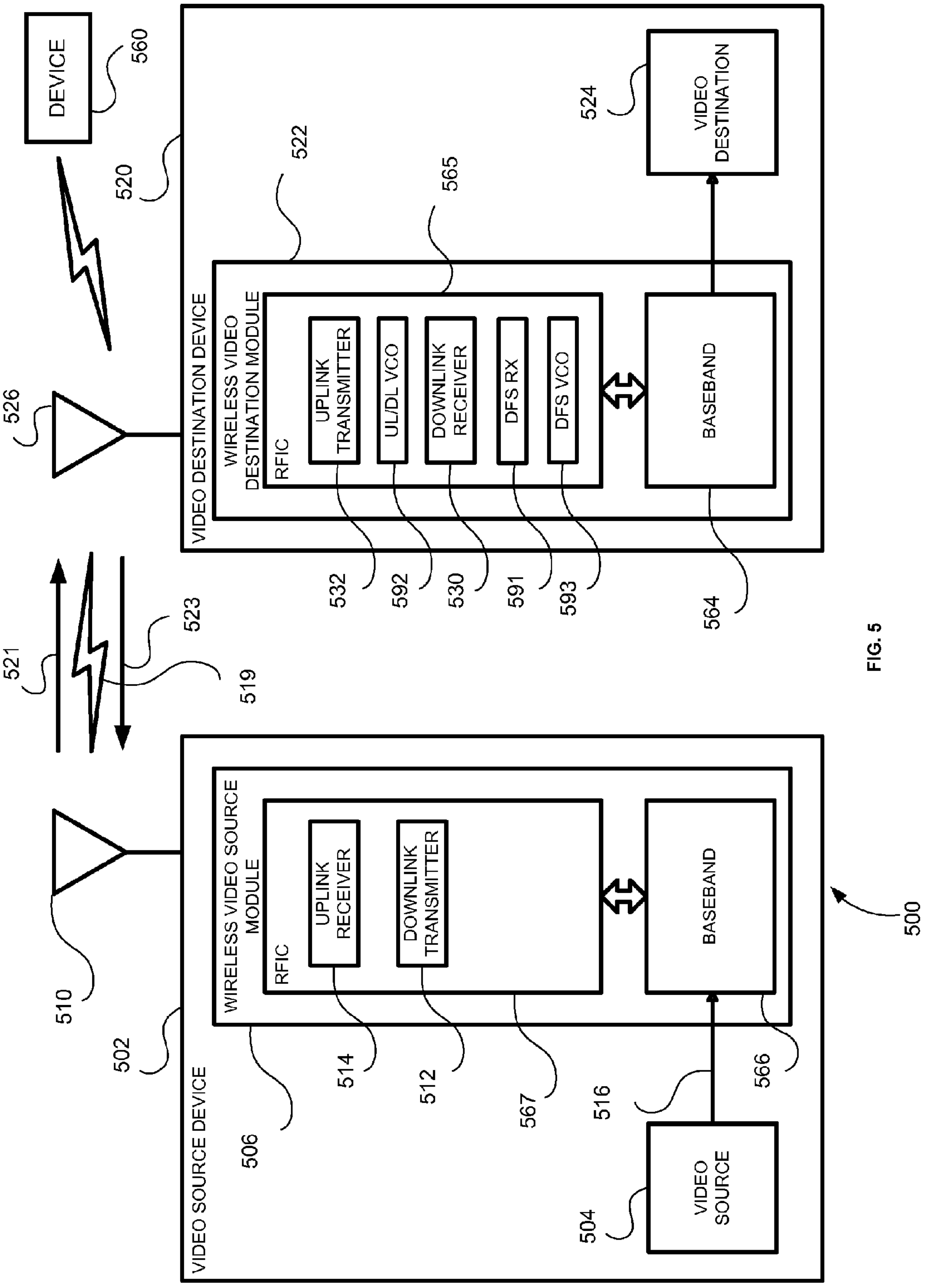
FIG. 5 is a functional block diagram of an exemplary data transmitter/receiver pair where the system relates to a specific video data transmission embodiment of the present invention.
Figure 6:
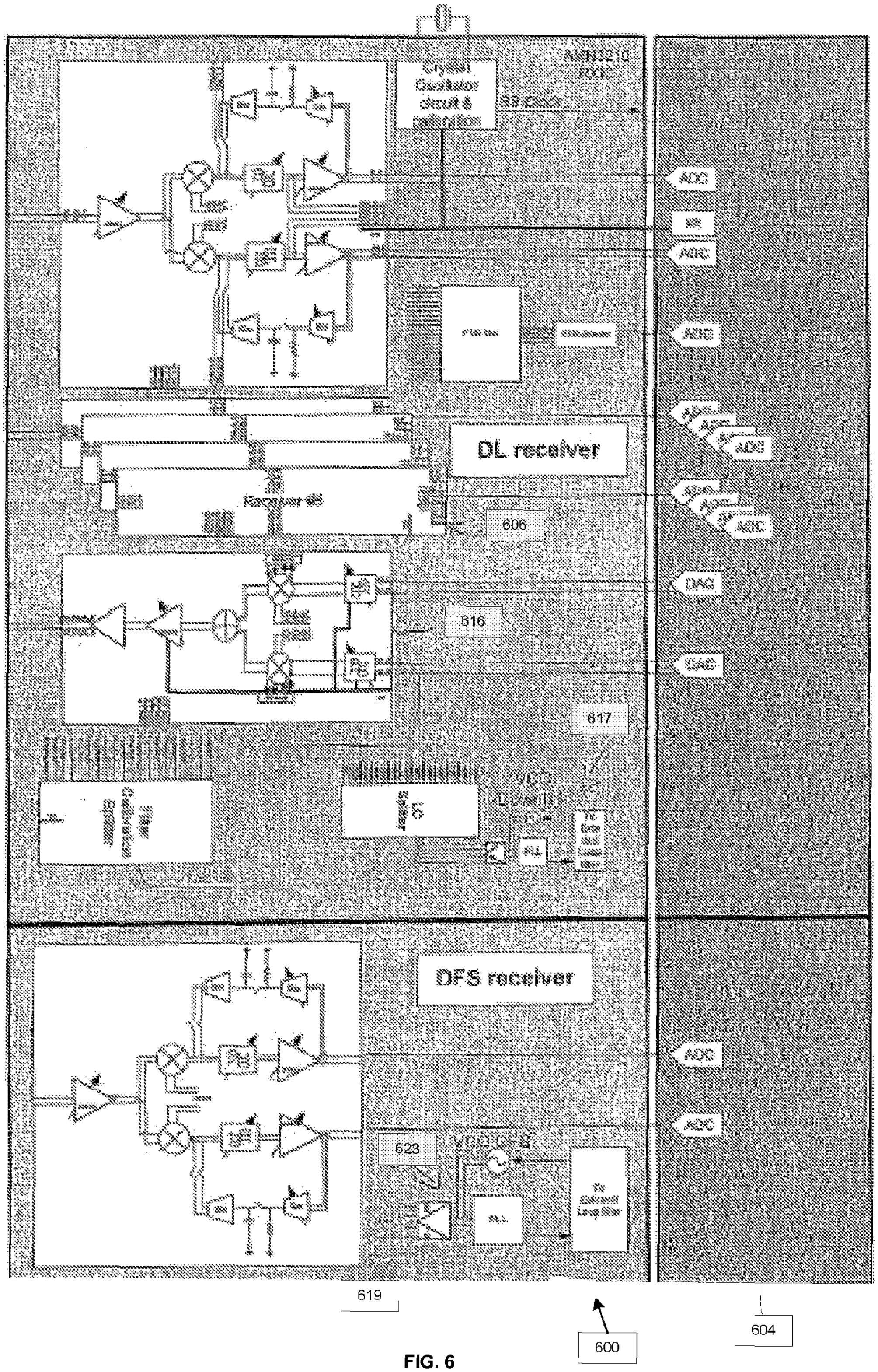
FIG. 6 schematically illustrates a receiver RF module where the system relates to a specific video data transmission embodiment of the present invention.

The following description of FIGS. 5 & 6 relate to a specific video data transmission embodiment of the present invention.

Reference is made to FIG. 5, which schematically illustrates a system 500, in accordance with some demonstrative embodiments.

In some demonstrative embodiments, system (500) may include a video source 504 to generate video data (516), e.g., as described below. System (500) may also include a wireless video source module (506), and a wireless video destination module (522) to communicate with wireless video source module (506) via a wireless communication Radio-Frequency (RF) channel (519), e.g., as described below.

In some demonstrative embodiments, wireless video source module (506) may transmit to wireless video destination module (522) a wireless downlink video transmission (521) corresponding to video data (516). For example, wireless video source module (506) may include a downlink transmitter (512) to transmit downlink video transmission (521) via a plurality of antennas (510), e.g., as described below.

In some demonstrative embodiments, wireless video destination module (522) may include a downlink receiver (530) to receive wireless downlink video transmission (521), for example, via at least one antenna (526); and to generate video data (528) based on downlink transmission (521), e.g., as described below.

In some demonstrative embodiments, system (500) may also include a video destination (524) to handle video data (528). In some non-limiting example, video destination (524) may include a display to display a video image based on video data (528).

In some demonstrative embodiments, wireless video destination module (522) may also include an uplink transmitter (532) to transmit to wireless video source module (506) a wireless uplink transmission (523), for example, via at least one antenna (526). For example, wireless video source module (506) may include an uplink receiver (514) to receive uplink transmission (523), for example, via antennas (510).

In some demonstrative embodiments, wireless video source module (506) may be implemented by a RF module (567) interfacing a Base-Band (BB) module (566). BB module (566) may include, for example, a digital BB chip; and/or RF module (567) may include a RF integrated chip (RFIC).

In some demonstrative embodiments, wireless video destination module (522) may be implemented by a RF module (565) interfacing a BB module (564), e.g., as described below with reference to FIG. 2. BB module (564) may include, for example, a digital BB chip; and/or RF module (565) may include a RFIC.

In some embodiments, wireless video destination module (522) may include a dynamic frequency selection (DFS) receiver (591) to receive signals over channel (519). Wireless video destination module (522) may implement a DFS mechanism to perform automatic/dynamic frequency/channel selection to allow for the selection of the channel frequency of channel (519), e.g., based on the signals received by DFS receiver (591).

The DFS mechanism may enable refraining from sharing channel (519) with other users, e.g., at any time, in order, for example, to allow transmit information over channel (519) continuously, with negligible errors, e.g., in contrast to WLAN communication where the transmission is packetized and loss of packets is allowed. Additionally, RF channels may differ in quality, and the automatic channel selection may enable to choose the channel with the best quality possible.

The DFS mechanism may be capable of detecting interference from other systems, e.g., radar systems, and avoid co-channel operation with these systems; and/or provide on aggregate a uniform loading of the spectrum across all devices. For example, the DFS mechanism may determine whether the received signals correspond to a radar transmission, e.g., of a device (560). The radar transmission may include signals of predetermined frequencies, e.g., within the frequency ranges 5250-5350 MHZ, and/or 5470-5725 MHZ.

In some embodiments, the DFS mechanism may be capable of performing a channel availability check. For example, before starting transmission over any channel, it has to be checked for availability. In some embodiments, no transmission is permitted during this check. Transmission may only be peimitted to transmit on available channels, where no channels are assumed available on power-up. The channel availability check may be performed during a continuous period in time, e.g., a period of at least 60 sec. The channel availability check may detect any radar, e.g., within the frequency ranges 5250-5350 MHZ, and/or 5470-5725 MHZ, for example, with a level above −64 dbm for maximum transmit power over 200 mW and −62 dBm for maximum transmit power below 200 mW. The detection probability, for a given radar signal, may be greater than 60%. The available channels may remain valid for a maximum period of 24 hours. The detection threshold may be compared against the received power averaged over 1 microsecond referenced to a 0 dBi antenna.

In some embodiments, the DFS mechanism may be capable of performing in-service monitoring. For example, the DFS mechanism may continuously monitor the operating channel, starting immediately after transmission has started, e.g., according to the channel availability check specifications described above.

In some embodiments, the DFS mechanism may be capable of performing channel shutdown. For example, immediately after detection of radar, the transmission over the channel may be terminated, e.g., within 10 sec, during which the aggregate transmission may not exceed 260 mSec (in FCC it is specified that 200 mSec of regular transmission are allowed along with the required transmission for vacating the operating channel).

In some embodiments, the DFS mechanism may be capable of performing a non-occupancy period. For example, after radar detection, e.g., during the channel availability check, in-service monitoring and/or channel shutdown, there may be no transmission over the channel, e.g., for at least 30 min. A new channel availability check may be performed before the channel can be identified again as an available channel.

In some embodiments, the DFS mechanism may be capable of performing uniform spreading. For example, a channel may be selected out of the list of usable channels so that the probability of selecting a given channel shall be, for example, within 10% of the theoretical uniform probability for all channels. For example, for n channels, the theoretical probability is 1/n.

In some embodiments, DFS receiver (591) may have one or more of the following specifications:

| DFS Receiver | Min | Typ | Max |
|---|---|---|---|
| Frequency Operation [GHz] | 4.9 | | 5.9 |
| Input signal @Antenna Input [dBm] | −65 | | −45 |
| SNDR at the Receiver outputs [dB] | | 15 | |
| Synthesizer phase noise [deg] | | 3 | |
| RX output is RSSI format or I/Q format? | | IQ | |
| RX output bandwidth [MHz] | | 10/20/40 | |
| High pass filter corner frequency [KHz] | 3 | | 500 |
| ADC ENOB [bits] | | 7 | |
| ADC Sampling frequency [MHz] | 80 | | 160 |
| ADC FS Range | | 1 | |

In some embodiments, integration of DFS receiver (591) may be integrated together with uplink transmitter (532) and/or downlink receiver (530) as part of RFIC (565). The integration of DFS receiver (591) as part of RFIC (565) may result in a relatively low cost and/or low size RF module.

In some embodiments, DFS receiver (591) may be required to perform the channel availability check, e.g., as described above, for example, to detect a radar signal in different frequencies during a continuous transmission over channel (519). Therefore, DFS receiver may be required to utilize a frequency synthesizer different than a frequency synthesizer utilized for the uplink and/or downlink transmissions of transmitter (532) and/or receiver (530).

In some embodiments, RF module (565) may include a first frequency synthesizer with integrated Voltage-Controlled Oscillator (VCO) (592) to generate frequencies to be used for the uplink and/or downlink transmissions of transmitter (532) and/or receiver (530); and a second frequency synthesizer with integrated VCO (593) to generate frequencies to be used by DFS receiver (591). In one example, RF module (565) may include a singled RFIC including two VCOs (592) and (593).

In some embodiments, VCO (592) and VCO (593) may be implemented such as to reduce and/or eliminate any crosstalk and/or pulling effects, between VCOs (592) and (593), e.g., as described herein.

In some embodiments, the VCOs (592) and (593) may be very close in frequency. The integration of two frequency synthesizers with two Inductor-Capacitor (LC) oscillators may result in a pulling effect between the two oscillators.

In some embodiments, VCOs (592) and (593) may include VCOs of first and second different types, respectively. In one example, VCO (592) may include a LC-type oscillator to generate frequencies for transmissions (521) and/or (523). VCO (593) may include a non-LC-type oscillator, e.g., a ring type Oscillator to generate frequencies to be used by DFS receiver (591). Such a combination may reduce significantly the pulling effect between oscillators (592) and (593), while allowing DFS receiver (591) to perform according to the DFS requirements described above.

In some demonstrative embodiments, downlink transmitter (512) may implement any suitable transmission method and/or configuration to transmit downlink transmission (521). Although embodiments of the invention are not limited in this respect, in some demonstrative embodiments, downlink transmitter (512) may generate downlink transmission (521) according to an Orthogonal-Division-Frequency-Multiplexing (OFDM) modulation scheme. According to other embodiments, downlink transmitter (512) may generate downlink transmission (521) according to any other suitable modulation and/or transmission scheme.

Although embodiments of the invention are not limited in this respect, in some demonstrative embodiments, downlink receiver (530) may receive and/or demodulate downlink transmission (521) according to the OFDM modulation scheme. According to other embodiments, downlink receiver (530) may receive and/or demodulate downlink transmission (521) according to any other suitable modulation and/or transmission scheme.

In some demonstrative embodiments, downlink transmission (521) may include a Multiple-Input-Multiple-Output (MIMO) transmission. For example, transmitter (512) may modulate transmission data (521) according to a suitable MIMO modulation scheme.

In one example, antennas (510) may include a plurality of transmit (Tx) antennas, e.g., four Tx antennas, to transmit MIMO downlink transmission (521); and/or antennas (526)

may include a plurality of receive (Rx) antennas, e.g., five Rx antennas, to receive MIMO downlink transmission (521).

In one example, antennas (526) may include one or more Tx antennas to transmit uplink transmission (523); and/or antennas (510) may include at least one Rx antenna to receive uplink transmission (523).

In some non-limiting demonstrative embodiments, downlink transmitter (512) may generate downlink transmission (521) including at least one coarse constellation symbol representing a first component of a data value video data (516), and at least one fine constellation symbol representing a second component of the data value, for example, by applying a de-correlating transformation, e.g., a Discrete-Cosine-Transformation (DCT), to video data (516), e.g., as described in U.S. patent application Ser. No. 11/551,641, entitled "Apparatus and method for uncompressed, wireless transmission of video", filed Oct. 20, 2006, and published May 3, 2007, as US Patent Application Publication US 2007-0098063 ("the '641 Application"), the entire disclosure of which is incorporated herein by reference.

In some demonstrative embodiments, downlink receiver (530) may be implemented by the wireless-video receiver described in the '641 Application. In some demonstrative embodiments, downlink receiver (530) may implement any suitable reception method and/or configuration to receive downlink transmission (521).

Although embodiments of the invention are not limited in this respect, types of antennae that may be used for antennas (510) and/or (526) may include but are not limited to internal antenna, dipole antenna, omni-directional antenna, a monopole antenna, an end fed antenna, a circularly polarized antenna, a micro-strip antenna, a diversity antenna and the like.

In some demonstrative embodiments, video source (504) and wireless video source module (506) may be implemented as part of a video source device (502), e.g., such that video source (504) and wireless video source module (506) are enclosed in a common housing, packaging, or the like. In other embodiments, video source (504) and wireless video source module (506) may be implemented as separate devices.

In some demonstrative embodiments, video destination (522) and wireless video destination module (522) may be implemented as part of a video destination device (520), e.g., such that video destination (522) and wireless video destination module (522) are enclosed in a common housing, packaging, or the like. In other embodiments, video destination (522) and wireless video destination module (522) may be implemented as separate devices.

In some demonstrative embodiments, wireless video source module (506) may include or may be implemented as a wireless communication card, which may be attached to video source (504) externally or internally.

In some demonstrative embodiments, wireless video destination module (522) may include or may be implemented as a wireless communication card, which may be attached to video destination (524) externally or internally.

In some demonstrative embodiments, downlink transmission (521) may include, for example, a HDTV video transmission or any other suitable video transmission.

In some demonstrative embodiments, video source (504) and/or video source device (502) may include any suitable video device or module, for example, a portable video source, a non-portable video source, a Set-Top-Box (STB), a DVD, a digital-video-recorder, a game console, a PC, a portable computer, a Personal-Digital-Assistant (PDA), a Video Cassette Recorder (VCR), a video camera, a cellular phone, a video player, a portable-video-player, a portable DVD player, an MP-4 player, a video dongle, a cellular phone, and the like. Video destination (524) and/or video destination device (520) may include any suitable video display or receiver to handle video data (528). For example, video destination (524) and/or video destination device (520) may include a display or screen, e.g., a flat screen display, a Liquid Crystal Display (LCD), a plasma display, a back projection television, a television, a projector, a monitor, an audio/video receiver, a video dongle, and the like.

Reference is now made to FIG. 6, which schematically illustrates a receiver RF module (600) in accordance with some demonstrative embodiments. RF module (600) may be, for example, an RFIC.

In some embodiments RF module (600) may interface a BB module (604). As shown in FIG. 2, Rx RF module (600) may include five Rx modules (606) to receive a downlink MIMO transmission via five respective Rx paths; and a Tx module (616) to transmit an uplink transmission via an uplink path.

In some embodiments, RF module (600) may include a frequency synthesizer with integrated VCO (617) to generate frequencies to be utilized by Rx modules (606) and/or Tx module (616) for the communication via the Rx paths and/or the Tx path, respectively.

In some embodiments, RF module (600) may also include a DFS receiver (619), for example, to detect a radar signal in different frequencies during the transmission over the Rx and/or Tx paths, e.g., as described above. RF module (600) may also include a frequency synthesizer with integrated VCO (623) to generate frequencies to be utilized by DFS receiver (619), e.g., for performing the channel availability check, e.g., as described above.

In some embodiments, VCO (617) and VCO (623) may be implemented such as to reduce and/or eliminate any crosstalk and/or pulling effects, between VCOs (617) and (623), e.g., as described herein.

In some embodiments, the VCOs (617) and (623) may generate relatively close frequencies. In some embodiments, VCOs (617) and (623) may include VCOs of first and second different types, respectively. In one example, VCO (617) may include a LC-type oscillator; and VCO (623) may include a non-LC-type oscillator, e.g., a ring type Oscillator. Such a combination may reduce significantly the pulling effect between oscillators (617) and (623), while allowing DFS receiver (619) to perform according to the DFS requirements described above.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A frequency scouting circuit collocated on a die with one or more other radio frequency integrated circuits and being functionally associated with a wireless video streaming circuit, wherein said scouting circuit comprises:

an adjustable frequency synthesizer adapted to generate a mixing signal at a given frequency;

a down converter functionally associated with said synthesizer and adapted to down convert signals at substantially the mixing signal frequency;

control logic adapted to alternate the given frequency through a set of possible transmission carrier frequencies corresponding to optional transmission carrier frequencies of the functionally associated wireless video streaming circuit based on an indicator of suitability of carrier frequencies; and a channel monitoring circuit block adapted to, during wireless video transmission of a given video stream over a first carrier frequency out of the set of possible transmission carrier frequencies, assess suitability of the first carrier frequency and at least a second optional transmission carrier frequency and relay said indicator of first and at least second carrier frequency suitability to said control logic.

2. The scouting circuit of claim 1, wherein said synthesizer includes an oscillator.

3. The circuit according to claim 2, wherein said oscillator is a dedicated oscillator.

4. The circuit according to claim 3, wherein said oscillator is substantially electromagnetically uncoupled from other oscillators on the same die.

5. The circuit according to claim 3, wherein said oscillator is a ring oscillator.

6. The circuit according to claim 1, wherein said indicator of suitability is associated with carrier frequency availability.

7. The circuit according to claim 1, wherein said indicator of suitability associated with carrier frequency quality.

8. The circuit according to claim 1, wherein said control logic is further adapted to relay said indicator of suitability to the functionally associated transmitter circuit.

9. The circuit according to claim 8, wherein said control logic is adapted to relay said indicator of suitability to the functionally associated transmitter circuit over an uplink.

10. The circuit according to claim 1, wherein said control logic is further adapted to update a record in a data table regarding carrier frequency availability.

11. The circuit according to claim 10, wherein said control logic is adapted to update a record in a data table regarding carrier frequency availability through an uplink.

12. The circuit according to claim 1, wherein said control logic is adapted to select the given frequency in response to signaling from the functionally associated transmitter circuit.

13. The circuit according to claim 1, wherein said control logic is adapted to select the given frequency based on a frequency scanning pattern or algorithm.

14. A data communication device comprising:

a receiver circuit adapted to receive data over one or more carrier frequencies from a set of possible carrier frequencies over which a functionally associated transmitter may transmit data;

a frequency scouting circuit collocated on a die with said receiver circuit and including:

(a) an adjustable frequency synthesizer having an oscillator, wherein said synthesizer is adapted to generate a mixing signal at a given frequency and said scouting circuit is operative substantially concurrently with reception of said receiver circuit of signals from the associated transmitter;

(b) a down converter functionally associated with said synthesizer and adapted to down convert signals at substantially the mixing signal frequency (c)a channel monitoring circuit block adapted to determine an indicator of suitability of a carrier frequency corresponding to the mixing signal frequency and at least a second optional transmission carrier frequency; and (d) control logic adapted to select the given frequency from the set of possible transmission carrier frequencies for the functionally associated transmitter based on an indicator of suitability received from said channel monitoring circuit block and switch the given frequency if said indicator of suitability is below a predefined threshold.

15. The device according to claim 14, wherein said indicator of suitability is associated with carrier frequency availability.

16. The device according to claim 15, wherein said control logic is further adapted to indicate carrier frequency availability to the functionally associated transmitter over an uplink.

17. The device according to claim 15, wherein said control logic is further adapted to update a record in a data table regarding carrier frequency availability.

18. The device according to claim 15, wherein said control logic is adapted to update a record in a data table regarding carrier frequency availability through an uplink.

19. The device according to claim 14, wherein said indicator of suitability is associated with carrier frequency quality.

20. The device according to claim 14, wherein said oscillator is a dedicated oscillator.

21. The device according to claim 20, wherein said oscillator is electromagnetically uncoupled from other oscillators in proximity.

22. The device according to claim 20, wherein said oscillator is a ring oscillator.

23. The device according to claim 14, wherein said control logic is adapted to select the given frequency in response to signaling from the functionally associated transmitter.

24. The device according to claim 14, wherein said control logic is adapted to select the given frequency based on a frequency scanning pattern or algorithm.

* * * * *